A. BRAMPTON & F. OSBORNE.
CONDUIT FITTING FOR ELECTRICAL AND OTHER PURPOSES.
APPLICATION FILED APR. 9, 1910.
1,020,123.
Patented Mar. 12, 1912.
2 SHEETS—SHEET 1.
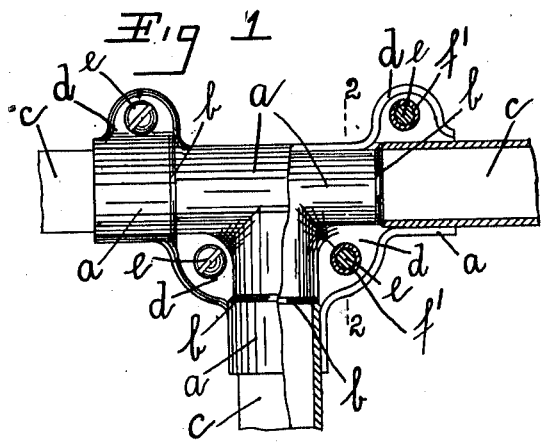
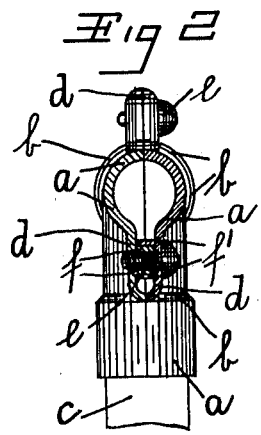
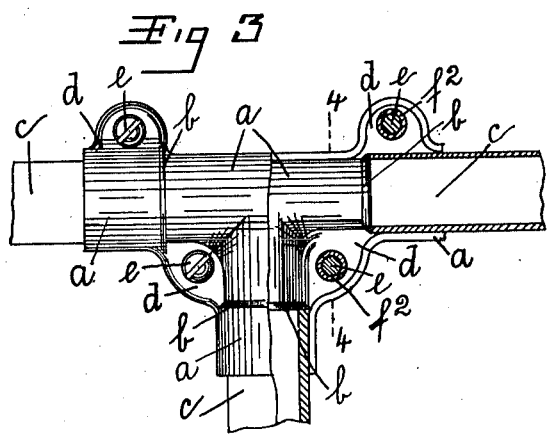
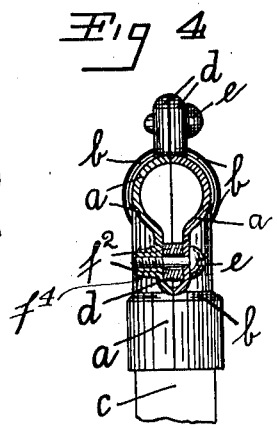
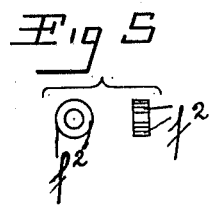
WITNESSES.
INVENTORS,
ARTHUR BRAMPTON
and FRED OSBORNE,
by
Attorney

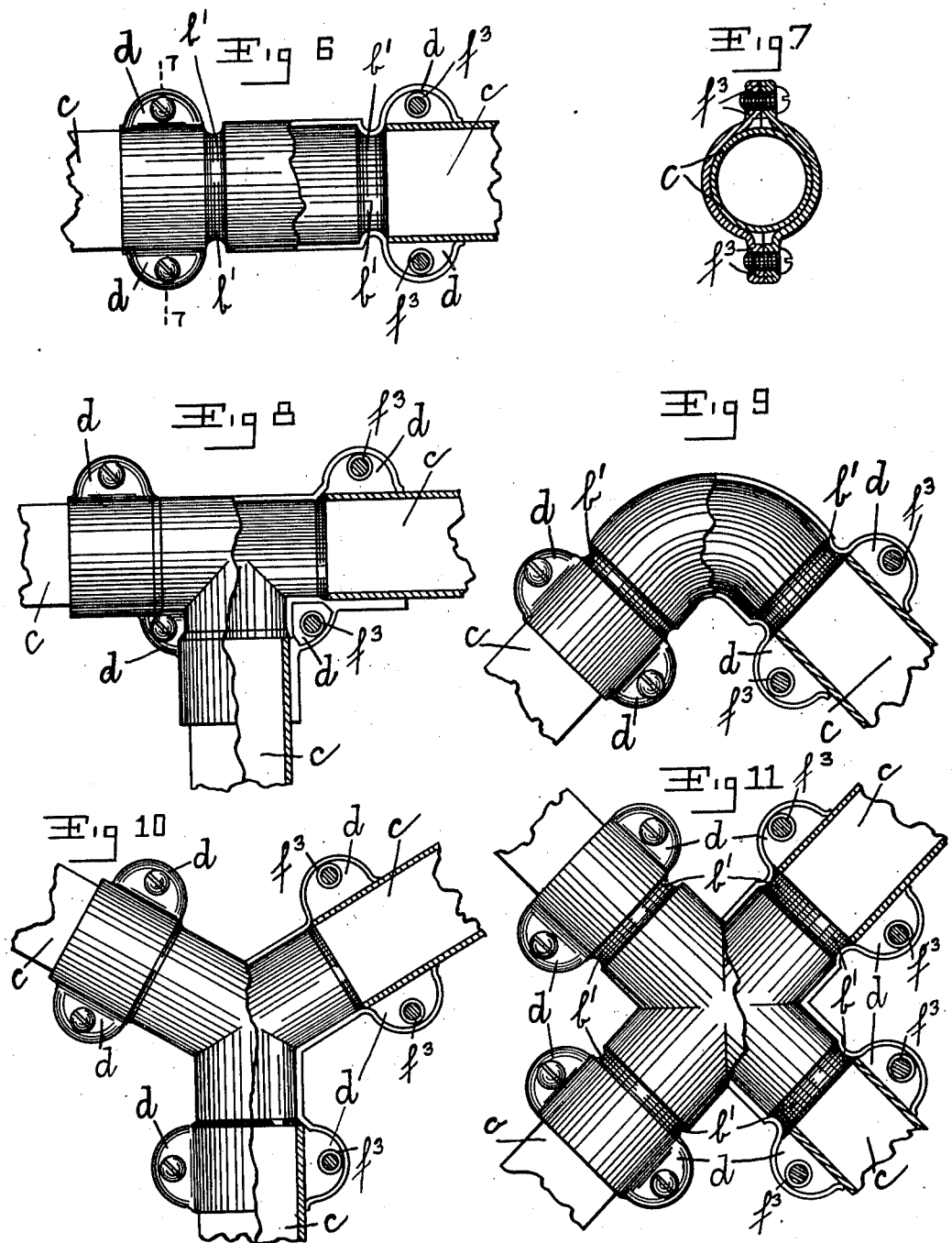

UNITED STATES PATENT OFFICE.

ARTHUR BRAMPTON, OF BIRMINGHAM, AND FRED OSBORNE, OF FOUR OAKS, ENGLAND.

CONDUIT-FITTING FOR ELECTRICAL AND OTHER PURPOSES.

1,020,123.    Specification of Letters Patent.    Patented Mar. 12, 1912.

Application filed April 9, 1910. Serial No. 554,545.

*To all whom it may concern:*

Be it known that we, ARTHUR BRAMPTON and FRED OSBORNE, subjects of the King of Great Britain, residing at Oliver Street Works, Birmingham, in the county of Warwick, England, and Holly Bank, Four Oaks, in the county of Warwick, England, respectively, have invented a new and useful Conduit-Fitting for Electrical and other Purposes; and we do hereby declare the following to be a full, clear, and exact description of the same.

Our invention comprises improvements in conduit fittings for electrical and other purposes and in the manufacture of same and refers to that class of fittings, or conduit junctions, which are made from sheet metal and in two halves bolted together; the object of the said invention being to manufacture same in a cheaper and improved manner.

According to our invention we manufacture the conduit fittings from sheet metal and having improved securing lugs and means for limiting the extent to which the conduit tubes may be inserted into the junctions. We take a blank of sheet metal and press or stamp same to the form of half the fitting, a shoulder or abutment being formed inside the fitting against which the conduit tube abuts. Lugs are formed integral with the fitting sleeves being pressed up and screw threaded for receiving the securing screws.

Referring to the drawings, Figure 1. illustrates a T piece according to our invention partly in section, said fitting having expanded ends or mouths forming internal shoulders and having telescoping sleeves for receiving and inclosing the screws. Fig. 2. is a section at 2—2 in Fig. 1. Fig. 3. is a similar view to Fig. 1 in which the sleeve is made separately in the form of a roller. Fig. 4. is a section at 4—4 in Fig. 3. Fig. 5. illustrates the roller removed. Fig. 6. shows a straight fitting or junction having an annular internal rib or abutment pressed up inside the fitting. Fig. 7. is a transverse section of same at 7—7 in Fig. 6. Fig. 8. illustrates a T fitting having expanded ends forming an internal shoulder according to our invention. Fig. 9. shows a simple right angle bend with the annular rib. Fig. 10. illustrates a three way bend with expanded ends and Fig. 11. shows a four way junction having the abutment ribs.

In carrying our invention into practice as shown upon the accompanying drawings at Figs. 1 and 2 we form the fitting $a$ from blanks of sheet metal each of which is stamped or pressed to a half round section having end openings of greater diameter than the rest of the fitting thus forming an abutment or shoulder $b$, which limits the extent to which the tube $c$ may be inserted into the fitting. The two halves of the fitting are each provided with lugs $d$ whereby they are bolted together by screws $e$ which may screw into the lug itself or they may be provided with nuts for the same purpose. As shown in Figs. 1-2 we press up from the lugs sleeves or necks $f$, $f^1$ which telescope one into the other, the inner one being internally screw threaded to receive the screw $e$ while the outer one surrounds the screw and prevents all risk of the cable being injured by rubbing on the screw.

At Figs. 3-5 we have shown a similar form of our conduit fitting but provided with a loose sleeve or roller $f^2$ for surrounding the screw, the screw entering and engaging the lugs. A sleeve, $f^4$, is pressed up on the outside of the fitting for giving a greater length of thread or grip for the screws.

In Figs. 6 and 7 we have shown a form of straight junction or fitting according to our invention having annular internal ribs $b^1$ for limiting the extent to which the conduit tubes $c$ may be inserted into the fitting. From each of the lugs $d$ we press up sleeves or necks $f^3$ which may have mutually engaging ends, and which when the two parts of the fitting are placed together, form a complete inclosing sleeve for the screw.

Fig. 8 shows our invention applied to a T bend having expanded ends for providing the tube abutment; Fig. 9 shows a simple right angle bend with annular rib abutment; Fig. 10 illustrates a three way fitting with expanded end abutments and Fig. 11 shows a four way junction with annular rib abutment.

Obviously we may make the fitting in any suitable shape to accommodate any suitable number of conduit tubes at the desired angles; and we may provide either of them with either the annular internal rib or enlarged end abutment at will.

As will be seen by our invention we provide an exceedingly simple and cheap conduit fitting or junction in which the securing screws are so inclosed that the cable is not injured by contact with same; while a considerable length of screw thread is provided for receiving the screws.

What we claim then is:—

1. In a conduit fitting, the combination of two sheet metal half round parts together forming a tubular fitting and having perforated lugs and inwardly turned edge flanges, sleeves being pressed up from the sheet metal immediately surrounding the perforations of certain of the lugs, said sleeves being internally screw-threaded and providing a greater length of thread than the normal thickness of the metal sheet; screws in said perforations and engaging the threads of said sleeves; and means surrounding the screws between said lugs and protecting the screws against contact with cables in the fittings.

2. In a conduit fitting for electrical and other purposes two half round parts each pressed from sheet metal and adapted to be placed together to form a tubular fitting, lugs on each side of said parts, transverse screws passing through said lugs for securing the two parts together, and sleeves pressed up from said lugs into the interior of the fitting and internally screw-threaded for the purpose of receiving the securing screws and providing a greater length of screw thread than the thickness of the metal, said sleeves preventing rubbing of the cable on said screws; substantially as set forth.

3. In a conduit fitting for electrical and other purposes two half round parts each pressed from sheet metal and adapted to be placed together to form a tubular fitting, means for limiting the extent to which the tubes may be inserted in such fitting, lugs on each of said parts, transverse screws passing through said lugs for securing the two parts together, and sleeves pressed up from said lugs into the interior of the fitting and internally screwed for the purpose of receiving the securing screws and providing a greater length of screw thread than the thickness of the metal, said sleeves preventing rubbing of the cable on said screws; substantially as set forth.

4. In a conduit fitting, for electrical and other purposes, two half round parts each pressed from sheet metal and adapted when placed together to form a tubular fitting, screws for securing the two parts together, mutually engaging sleeves pressed up from each of said fittings for the purpose of inclosing and surrounding the screws; all for the purpose specified and substantially as set forth.

In testimony whereof, we have signed our names to this specification in the presence of two subscribing witnesses.

ARTHUR BRAMPTON.
FRED OSBORNE.

Witnesses:
HAROLD C. FORRESTER,
NORMAN S. BARLOW.